US011517036B2

(12) United States Patent
Zhang et al.

(10) Patent No.: US 11,517,036 B2
(45) Date of Patent: Dec. 6, 2022

(54) FLAVOR MODIFIERS FOR MEAT ANALOG PRODUCTS

(71) Applicant: Givaudan SA, Vernier (CH)

(72) Inventors: Yuangang Zhang, Cincinnati, OH (US); Panchali Chakraborty, Mason, OH (US); Francisco Valentino Villagran, Mason, OH (US)

(73) Assignee: Givaudan SA, Vernier (CH)

( * ) Notice: Subject to any disclaimer, the term of this patent is extended or adjusted under 35 U.S.C. 154(b) by 291 days.

(21) Appl. No.: 16/498,670

(22) PCT Filed: Apr. 6, 2018

(86) PCT No.: PCT/EP2018/058918
§ 371 (c)(1),
(2) Date: Sep. 27, 2019

(87) PCT Pub. No.: WO2018/185318
PCT Pub. Date: Oct. 11, 2018

(65) Prior Publication Data
US 2020/0037646 A1    Feb. 6, 2020

Related U.S. Application Data

(60) Provisional application No. 62/483,063, filed on Apr. 7, 2017.

(51) Int. Cl.
A23L 27/21    (2016.01)
A23L 27/26    (2016.01)
A23L 31/15    (2016.01)
A23J 3/22     (2006.01)

(52) U.S. Cl.
CPC ............ A23L 27/21 (2016.08); A23J 3/227 (2013.01); A23L 27/26 (2016.08); A23L 31/15 (2016.08); A23V 2002/00 (2013.01)

(58) Field of Classification Search
CPC .......... A23L 27/21; A23L 23/26; A23L 31/15; A23J 3/227; A23V 2002/00
USPC ......................................................... 426/534
See application file for complete search history.

(56) References Cited

U.S. PATENT DOCUMENTS

| 3,320,070 A | 5/1967 | Hartmann |
| 3,365,306 A | 1/1968 | Perret |
| 5,039,543 A * | 8/1991 | Lee ............... A23L 27/215 426/533 |
| 2009/0291188 A1 * | 11/2009 | Milne ............ A23L 13/428 426/574 |
| 2012/0207904 A1 * | 8/2012 | Twombly ........... A23J 3/16 426/540 |
| 2014/0205729 A1 | 7/2014 | Didzbalis et al. |
| 2015/0086694 A1 | 3/2015 | Shi et al. |
| 2016/0235090 A1 | 8/2016 | Janvary et al. |
| 2017/0055548 A1 * | 3/2017 | Chakraborty ..... A23C 9/1307 |
| 2017/0188612 A1 * | 7/2017 | Varadan .......... A23L 13/43 |

FOREIGN PATENT DOCUMENTS

| CN | 101971960 A | 2/2011 |
| EP | 2 695 526 A1 | 2/2014 |
| GB | 1311302 A | 3/1973 |
| KR | 10 2013 0065927 A | 6/2013 |

OTHER PUBLICATIONS

International Search Report for PCT Application No. PCT/EP2018/058918, dated May 28, 2018.
Written Opinion for PCT Application No. PCT/EP2018/058918, dated May 28, 2018.
GB Search Report for Application No. GB 1707641.5, dated Oct. 19, 2017.

* cited by examiner

Primary Examiner — Hamid R Badr
(74) Attorney, Agent, or Firm — Curatolo Sidoti & Trillis Co., LPA; Floyd Trillis, III; Salvatore A. Sidoti

(57) ABSTRACT

A flavor modifier composition for a meat analog is provided. The flavor modifier composition includes a yeast extract; a fatty acid; peptide material having a molecular weight of from about 300 to about 10,000 daltons; and at least two free amino acids wherein at least one free amino acid is a sulfur containing amino acid.

17 Claims, No Drawings

FLAVOR MODIFIERS FOR MEAT ANALOG PRODUCTS

CROSS REFERENCE TO RELATED APPLICATIONS

This application is a national stage application of International Application No. PCT/EP2018/058918, filed 6 Apr. 2018, which claims priority from U.S. Provisional Patent Application No. 62/483,063, filed 7 Apr. 2017, which applications are incorporated herein by reference.

FIELD OF THE INVENTION

The present disclosure relates to flavor modifiers for meat analog products produced from non-animal derived protein and processes for producing the meat analog products. More particularly, the present disclosure relates to flavor modifiers having certain yeast extracts, fatty acids, peptide compounds and free amino acids that improve the organoleptic properties of meat analog products.

BACKGROUND OF THE INVENTION

Proteins are an essential element in human nutrition. Meat, in the form of animal flesh, and fish are the most common sources of high protein food. However, often the high cost of meat products prohibits people from buying them and, thus, makes them unavailable to many people in the world. Meat products may also be prone to spoiling. In addition, there are people who either do not eat meat or prefer to eat less meat for health or religious reasons. Therefore, the use of non-animal proteins in foodstuffs is becoming increasingly important due to the benefits of protein in the diet. While consumers expect their food products to have multi-functional benefits, consumers still have high expectations that those products deliver great taste along with efficacy in terms of health benefits. Because each type of protein has its own inherent taste, formulating protein into food products can produce distinctive tastes and textures perceived as unappealing. For example, products made from leguminous plants, such as soy or pea, display a flavor profile described as grassy, beany, green, earthy, nutty and/or bitter. Further, consumers are interested in plant-based products that can replicate meat in terms of mouthfeel, texture, taste, color and smell.

Food scientists have devoted much time developing methods for preparing acceptable meat-like food applications, such as beef, pork, poultry, fish, and shellfish analogs, from a wide variety of non-animal proteins. One such approach is texturization into fibrous meat analogs, for example, through extrusion processing. The resulting meat analog products exhibit improved meat-like visual appearance and improved texture.

However, there remains a need for a meat analog product that more closely simulates the fibrous structure of animal meat and has a more meat-like moisture, texture, mouthfeel, flavor and color.

SUMMARY OF THE INVENTION

In one embodiment, a flavor modifier composition for a meat analog includes a yeast extract; a fatty acid; peptide material having a molecular weight of from about 300 to about 10,000 daltons; and at least two free amino acids wherein at least one free amino acid is a sulfur containing amino acid.

In another embodiment, a meat analog includes a non-animal protein; a carbohydrate; an edible lipid; and a flavor modifier composition, including a yeast extract; peptide material having a molecular weight of from about 300 to about 10,000 daltons; and at least two free amino acids wherein at least one free amino acid is a sulfur containing amino acid.

In yet another embodiment, a method of producing a meat analog includes the steps of producing a flavor modifier including a yeast extract; a fatty acid; peptide material having a molecular weight of from about 300 to about 10,000 daltons; and at least two free amino acids wherein at least one free amino acid is a sulfur containing amino acid; mixing the flavor modifier with a non-animal protein; and texturizing the mixture into a meat analog form having a moisture content of from about 50% to about 65%.

These and other features, aspects and advantages of specific embodiments will become evident to those skilled in the art from a reading of the present disclosure.

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present disclosure relates to flavor modifiers for meat analog products produced from non-animal derived protein and processes for producing the meat analog products. The flavor modifiers according to the present disclosure include the combination of certain yeast extracts, fatty acids, plant derived peptide compounds and free amino acids that can be added to meat analog products in order to provide a meaty character and enhanced juiciness, body and mouthfeel.

"Meat analog" is a food product that approximates the aesthetic qualities and/or chemical characteristics of certain types of meat.

One of the most important criterion for consumer acceptance of foods is flavor. Proteins have little flavor of their own, but influence flavor perception via binding and/or adsorption of flavorants. Protein ingredients both transmit undesirable off-notes to foods and reduce perceived impact of desirable flavorants. In response, Applicants have developed a flavor modifier for meat analog products that makes it possible to provide products containing non-animal proteins with an improved flavor profile with reduced off-notes.

Flavor Modifier Composition

According to the present disclosure, flavor compositions may include a yeast extract, a fatty acid, peptide material having a molecular weight of from about 300 to about 10,000 daltons, and at least two free amino acids selected from the group consisting of cysteine, methionine, lysine, arginine, histidine, taurine, aspartic, alanine, leucine, isoleucine, glutamine, phenylalanine, proline, valine, glycine, serine and threonine. In one embodiment, at least one free amino acid is a sulfur containing amino acid. The flavor compositions may also include other optional ingredients for particular applications.

In one embodiment, a flavor composition according to the present disclosure may include yeast extract. Yeast extract is the common name for various forms of processed yeast products made by extracting the cell contents (removing the cell walls). Yeast extract is a natural ingredient that helps to balance out and bring back the meaty character that is lost in the vegetarian diet, providing a savoury taste. As an ingredient, yeast extract is extremely versatile for food production. It is used to season sauces, bouillons, soups, savoury snacks and ready meals. It not only complements the savoury taste of meat and fish dishes, but it is also perfect for preparing vegetarian dishes as it is free from animal ingredients but still provides a meaty taste. Furthermore, yeast extract helps to counteract the loss of savouriness that usually occurs when the salt content of a dish is reduced, and as a result, it is often used in products with a low salt content.

Suitable yeast extracts include, for example, Yeast Extract Powder Bionis YE 3, Yeast Extract Powder Aromild UH-15, and Yeast Extract Powder Plantex BST71.

The flavor composition may include the yeast extract in an amount from about 1% to about 40%, in another embodiment from about 5% to about 30%, in yet another embodiment from about 10% to about 20%, or any individual number within the range, by weight of the composition.

In one embodiment, a flavor composition according to the present disclosure may include a fatty acid. The fatty acids employed may be saturated or unsaturated, may contain from 6 to 30 carbon atoms, in another embodiment from 10 to 27 and in another embodiment from 16 to 24 carbon atoms. They may, for instance, be obtained from any edible triglyceride fat or oil by enzymatic, chemical or high temperature/pressure hydrolyses. Examples of suitable oils from which fatty acids may be obtained include sunflower, safflower, linseed, blackcurrant seed and grapeseed oils which are naturally rich in linoleic acid (64-78%), and olive oil, low erucic acid rapeseed oil and high oleic safflower oils which are naturally rich in oleic acid. Fatty acids suitable for employment in the present invention include, for example, lauric acid, lauroleic acid, myristic acid, myristoleic acid, pentadecanoic acid, palmitic acid, stearic acid, oleic acid, linoleic acid, palmitoleic acid, margaric acid, dihydroxystearic acid, ricinoleic acid, elaidic acid, alpha-linolenic acid, dihomogamma-linolenic acid, eleostearic acid, licanic acid, arachidonic acid, arachidic acid, eicosenoic acid, behenic acid, erucic acid, lignoceric acid, esters thereof, glycerides thereof, which may be used individually or as mixtures.

In a typical embodiment, the compositions comprise from about 0.25% to about 10% of the fatty acid material, by weight of the composition, and depending upon the particular embodiment desired. In one embodiment, the compositions comprise from about 0.75% to about 5% of the fatty acid material, by weight of the composition. In another embodiment, the composition may comprise from about 1% to about 3% of the fatty acid material, or any individual number within the range, by weight of the composition.

In one embodiment, a flavor composition according to the present disclosure may include a peptide material. The peptide material can be derived from non-animal proteins. For purposes of the present disclosure, "non-animal protein" refers to protein preparations made from raw materials including, but not limited to, grain (rice, millet, maize, barley, wheat, oat, sorghum, rye, teff, triticale, amaranth, buckwheat, *quinoa*); legume or pulses (soybean, sesame, mung beans, chickpeas, garbanzo, peas, fava beans, lentils, lima beans, lupins, peanuts, pigeon peas, runner beans, kidney beans, navy beans, pinto beans, azuki beans, cowpea, black-eyed peas); seed and oilseed (black mustard, India mustard, rapeseed, canola, safflower, sunflower seed, flax seed, hemp seed, poppy seed, pumpkin, chia, sesame); nut (almond, walnut, Brazil, Macadamia, cashews, chestnuts, hazelnuts, pine, pecans, pistachio and gingko); algal (kelp, wakame, *Spirulina, Chlorella*); mycoprotein or fungal protein; insects and leaf protein.

In one embodiment, the term "peptide material" is understood to indicate a protein hydrolysate and may contain all types of peptides that may vary in length as well as a certain amount of free amino acids resulting from the hydrolysis. The protein raw material is hydrolysed by one or more hydrolytic enzymes. In one example, enzyme preparations are used which have a low exo-peptidase activity to minimise the liberation of free amino acids and to improve taste profiles of the protein hydrolysates. In one embodiment, the peptide material has a molecular weight of from about 300 to about 10,000 daltons and in another embodiment from about 300 to about 5,000 daltons. Further, the peptide material may be present in an amount from about 0.5% to about 5%, in another embodiment from about 1% to about 2%, or any individual number within the range, by weight of the composition.

In one embodiment, a flavor composition according to the present disclosure may include at least two additional free amino acids. Suitable amino acids include, for example, cysteine, methionine, lysine, arginine, histidine, taurine, aspartic, isoleucine, leucine, alanine and glycine. In one embodiment, at least one of the additional free amino acids is a sulfur containing amino acid.

In a typical embodiment, the compositions comprise from about 2% to about 25% of each additional free amino acid, by weight of the composition, and depending upon the particular embodiment desired. In one embodiment, the compositions comprise from about 5% to about 20% of each additional free amino acid, by weight of the composition. In another embodiment, the composition may comprise from about 10% to about 15% or any individual number within the range of each additional free amino acid, by weight of the composition.

The flavor modifier compositions may, optionally, include additional ingredients which include, but are not limited to, flavorants, stabilizers, emulsifiers, preservatives, gums, starches, dextrins, vitamins and minerals, functional ingredients, organic acids such as succinic acid and lactic acid, umami compounds, ribotides, vegetable oil, salts, antioxidants and sweeteners (luo han guo, rubusoside, stevioside, glycosylated stevia extract, rebauadiosides (A, C, D, M, X).

By "flavorant" it is meant a composition created by a flavorist using methods known to the skilled person that is a mixture of tastants, aroma compounds and sensates. Examples of suitable flavorants include natural flavors, artificial flavors, spices, seasonings, and the like. Exemplary flavorants include synthetic or natural flavor oils and flavoring aromatics and/or oils, oleoresins, essences, and distillates, and a combination comprising at least one of the foregoing.

Generally any flavorant or food additive such as those described in "Chemicals Used in Food Processing", Publication No 1274, pages 63-258, by the National Academy of Sciences, can be used. This publication is incorporated herein by reference.

In one embodiment, stabilizers enhance physical properties of plant protein containing consumables by imparting viscosity or mouthfeel properties that may increase consumer appeal. Stabilizers may be natural or artificial and may contribute to a uniform appearance of products by stabilizing and or suspending insoluble materials and preventing separation or settling of ingredients. Examples of stabilizers may include, but are not limited to, emulsifiers, starches, gums, and various hydrocolloids such as guar, acacia, locust bean, xanthan, gellan, carrageenan, cellulose, and pectin. Approximate ranges of stabilizers may vary from 0.02 to 5% depending on desired product properties and functionality of stabilizers.

In another embodiment, vitamins and minerals may be added to fortify meat analogs. As an example, in some embodiments, the product may be fortified with calcium using calcium sources such as carbonate ($CaCO_3$) and/or potassium and phosphates.

In another embodiment, functional ingredients like fiber, plant sterols, etc. may be added to meat analogs to enhance functionality of products. In another embodiment, salts of various types may also be used to improve taste, and to act as buffering agents to enhance protein stability. Such salts include sodium citrate, sodium chloride, potassium citrate, potassium phosphate, and dipotassium phosphate.

In another embodiment, antioxidants may prevent and/or reduce oxidation and may preserve the flavorant and appearance of the product during refrigerated and/or unrefrigerated storage. Antioxidants may reduce oxidation by trapping free radicals in the product.

In another embodiment, sweeteners may be natural, artificial, and/or high-intensity and may function to make the products taste more appealing. Depending on their sweetening power, sweeteners may comprise approximately 0.1.% to 20% of the flavor system or composition. Natural, high-intensity sweeteners, such as stevia or stevia derivatives, may be used as a low-calorie alternative to or in combination with other sweeteners, such as other natural, high-intensity sweeteners, sugar (e.g., liquid sugar, crystallized sugar, honey, agave, cane juice, etc.), and/or artificial sweeteners (e.g., sucralose, aspartame, saccharine, etc.). In some embodiments, an amount of sugar to be combined with the natural, high-intensity sweetener may be selected to yield a selected sweetness level and selected number of calories, while minimizing metallic or bitter flavors that may be associated with the natural, high-intensity sweetener alone.

Flavor modifier compositions according to the present disclosure may also include certain carboxylic acid-amino acid conjugates. For example, compounds of formula (I) may be included and represented by the formula

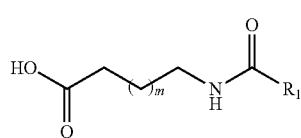

(I)

edible salts thereof, and their use in edible compositions wherein $R_1$ is an alkyl residue containing 6 to 20 carbon atoms, or an alkene residue containing from 9 to 25 carbon atoms with 1 to 6 double bonds, $R_3$ together with the carbonyl group to which it is attached is a residue of a carboxylic acid, and m is 0 or 1.

According to one embodiment, the compound of formula (I) may be incorporated into a meat analog product at a level of from 1 ppb to 10 ppm.

It will be apparent to the person skilled in the art that when m is 1, the amino acid residue connected to the carbonyl carbon atom is a residue of gamma amino butyric acid (GABA), whereas when m is 0, the amino acid residue is a residue of beta-alanine (Beta Ala). Both the compounds of formula (I) wherein m is 1 and the amino acid residue is a residue of GABA, and the compounds of formula (I) wherein m is 0 and the amino acid residue is a residue of beta-alanine, their edible salts, as well as their use in edible compositions, are all embodiments of the present disclosure.

Edible salts include those typically employed in the food and beverage industry and include chlorides, sulphates, phosphates, gluconates, sodium, citrates, carbonates, acetates and lactates.

The carboxylic acids can likewise be represented by abbreviations. Henceforth, the carboxylic acid residues may be referred to by the abbreviation Cn, wherein "n" represents the number of carbon atoms in the residue. For example, the residue of an 18 carbon acid may be abbreviated as C18. Still further, if the 18 carbon acid is saturated, e.g. stearic acid. It may be abbreviated as C18:0 (because it contains zero double bonds), whereas an 18 carbon acid having one double bond—e.g. oleic acid—may be abbreviated as C18:1. Still further, if the C18 acid has a single double bond in the cis configuration, then it can be abbreviated as C18:1c. Similarly, if the double bond was in the trans configuration, then the abbreviation becomes C18:1t.

The compounds of formula (I) can also be represented in terms of these abbreviations. For example, the compound of formula (I) consisting of a residue of a C18 carboxylic acid and a residue of the amino acid Beta Alanine can be represented by the abbreviation C18-Beta Ala. For simplicity the compounds of formula (I) henceforth may be represented in this abbreviated form.

As is evident from the above formula (I) the amino nitrogen atom on the amino acid residue is bound to a carbonyl carbon atom of the carboxylic acid residue to form an amide linkage. Thus, the abbreviated form C18-Beta Ala represents the compound of formula (I) in which the residue of Beta Alanine is connected via its nitrogen atom to the carbonyl carbon atom of a C18 carboxylic acid.

In one embodiment, the carboxylic acid residue is a residue of a fatty acid. The fatty acid residue may be the residue of a C8 to C22 fatty acid. The fatty acid may be mammalian or non-mammalian. A mammalian fatty acid is a natural or synthetic fatty acid that is identical in structure to one naturally produced in a mammal, including, but not limited to, myristic acid, palmitic acid, stearic acid, oleic acid, linoleic acid, linolenic acid, eicosattienoic acid, arachidonic acid, eicosapentenoic acid, and docosatetraenoic acid. A non-mammalian fatty acid is a natural or synthetic fatty acid not normally produced by a mammal, including, but not limited to, pentadecanoic acid; heptadecanoic acid; nonadecanoic acid; heneicosanoic acid; 9-trans-tetradecenoic acid; 10-trans-pentadecenoic acid; 9-trans-hexadecenoic acid; 10-trans-heptadecenoic acid; 10-trans-heptadecenoic acid; 7-trans-nonadecenoic acid; 10,13-nonadecadienoic acid; 11-trans-eicosenoic acid; and 12-transhenicosenoic acid.

The fatty acid residues may be saturated or unsaturated. If they are unsaturated, they may have 1, 2 or 3 double bonds, which may be in cis- or trans-configuration. More particularly, the fatty acid residues are C16 to C18, and may be saturated or unsaturated.

The skilled person will appreciate, however, that natural sources of these fatty acids, for example almond oil, avocado oil, castor oil, coconut oil, corn oil, cottonseed oil, olive oil, peanut oil, rice bran oil, safflower oil, sesame oil, soybean oil, sunflower oil, palm oil and canola oil, each consist of a complex mixture of fatty acids. For example, safflower oil is predominately a source of the C18:2 linoleic acid, nevertheless it may contain other fatty acids, such as linolenic acid (C18:3) and palmitic acid (C16:0), amongst others. Accordingly, reference herein to a compound containing a particular fatty acid residue, for example a residue of C18 fatty acid, may be a reference to a pure, or substantially pure C18 fatty acid residue, or it may relate to a mixture of fatty acid residues with the predominant residue being a C18 residue. In one embodiment, the fatty acid residues are C16 to C18.

The compounds include C8-GABA, C9-GABA, C10-GABA, C12-GABA, C14-GABA, C16-GABA, C18-GABA, C20-GABA and C22-GABA. The compounds include C8-GABA, C9-GABA, C10-GABA, C12-GABA, C14-GABA, C16-GABA, C18-GABA, C20-GABA and C22-GABA, wherein the carboxylic acid residue is saturated. The compounds include C8-GABA, C9-GABA, C10-GABA, C12-GABA, C14-GABA, C16-GABA, C18-GABA, C20-GABA and C22-GABA, wherein the carboxylic acid residue is unsaturated and contains 1, 2 or 3 double bonds. The double bonds may be in cis-configuration, trans-configuration or a mixture of cis- and trans-configuration. In one embodiment, compounds include C10-GABA, C12-GABA, more particularly C12:1-GABA, C14-GABA, C16-GABA, more particularly C16:1-GABA, C18-GABA, more particularly C18:1-GABA, still more particularly C18:1c-GABA and C18:1t-GABA. In another embodiment, the compound is C18:2-GABA.

In one embodiment, the compounds include C8-Beta Ala, C9-Beta Ala, C10-Beta Ala, C12-Beta Ala, C14-Beta Ala, C16-Beta Ala, C18-Beta Ala, C20-Beta Ala and C22-Beta Ala, wherein the carboxylic acid residue is saturated. In another embodiment, the compounds include C8-Beta Ala, C9-Beta Ala, C10-Beta Ala, C12-Beta Ala, C14-Beta Ala, C16-Beta Ala, C18-Beta Ala, C20-Beta Ala and C22-Beta Ala, wherein the carboxylic acid residue is unsaturated and contains 1, 2 or 3 double bonds. The double bonds may be in cis-configuration, trans-configuration or a mixture of cis- and trans-configuration. In another embodiment, the compounds include C18:2-Beta Ala and C18:2-gaba.

In another embodiment, flavor modifier compositions according to the present disclosure may also include compounds of formula (II) and represented by the formula

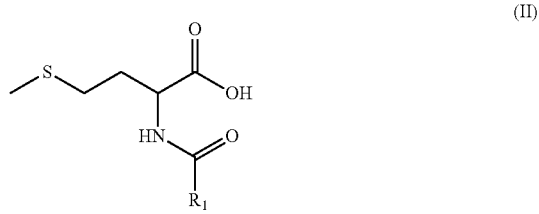

(II)

their edible salts, and their use in edible compositions wherein $R_1$ is an alkyl residue containing 6 to 20 carbon atoms, or an alkene residue containing from 9 to 25 carbon atoms with 1 to 6 double bonds, $R_1$ together with the carbonyl group to which it is attached is a residue of a carboxylic acid.

According to one embodiment, the compound of formula (II) may be incorporated into a meat analog product at a level of from 1 ppb to 10 ppm.

The skilled person will appreciate that the amino acid residue in the compounds defined above is the methionine residue (Met).

As is evident from the above formula (II), the amino nitrogen atom on the amino acid residue is bound to a carbonyl carbon atom of the carboxylic acid residue to form an amide linkage. Thus, the abbreviated form C18-Met represents the compound of formula (I) in which the residue of Methionine is connected via its nitrogen atom to the carbonyl carbon atom of a C18 carboxylic acid.

In one embodiment, the compounds include C8-Met, C9-Met, C10-Met, C12-Met, C14-Met, C16-Met, C18-Met, C20-Met and C22-Met. In another embodiment, the compounds include C8-Met, C9-Met, C10-Met, C12-Met, C14-Met, C16-Met, C18-Met, C20-Met and C22-Met, wherein the carboxylic acid residue is saturated. In another embodiment, the compounds include C8-Met, C9-Met, C10-Met, C12-Met, C14-Met, C16-Met, C18-Met, C20-Met and C22-Met wherein the carboxylic acid residue is unsaturated and contains 1, 2 or 3 double bonds. The double bonds may be in cis-configuration, trans-configuration or a mixture of cis- and trans-configuration.

In one embodiment, compounds bearing the Met residue include N-geranoyl-Met. N-palmitoyl-Met, N-palmitenoyl-Met, N-stearoyl-Met, N-oleoyl-Met, N-linoleoyl-Met and N-linolenoyl-Met.

In another embodiment, flavor modifier compositions according to the present disclosure may also include compounds of formula (III) and represented by the formula

(III)

their edible salts, and their use in edible compositions wherein $R_1$ is an alkyl residue containing 6 to 20 carbon atoms, or an alkene residue containing from 9 to 25 carbon atoms with 1 to 6 double bonds, $R_1$ together with the carbonyl group to which it is attached is a residue of a carboxylic acid.

According to one embodiment, the compound of formula (III) may be incorporated into a meat analog product at a level of from 1 ppb to 10 ppm.

The skilled person will appreciate that the amino acid residue in the compounds defined above is the proline residue (Pro).

As is evident from the above formula (III), the amino nitrogen atom on the amino acid residue is bound to a carbonyl carbon atom of the carboxylic acid residue to form an amide linkage. Thus, the abbreviated form C18-Pro represents the compound of formula (III) in which the residue of Proline is connected via its nitrogen atom to the carbonyl carbon atom of a (18 carboxylic acid.

In one embodiment, the compounds include C8-Pro, C9-Pro, C10)-Pro, C12-Pro, C14-Pro, C(16-Pro, C18-Pro, C20-Pro and C22-Pro. In another embodiment, the compounds include C8-Pro, C9-Pro, C10-Pro, C12-Pro, C14-

Pro, C16-Pro, C18-Pro, C20-Pro and C22-Pro, wherein the carboxylic acid residue is saturated. In another embodiment, the compounds include C8-Pro, C9-Pro, C10-Pro, C12-Pro, C14-Pro, C16-Pro, C18-Pro, C20-Pro and C22-Pro, wherein the carboxylic acid residue is unsaturated and contains 1, 2 or 3 double bonds. The double bonds may be in cis-configuration, trans-configuration or a mixture of cis- and trans-configuration.

In one embodiment, the compounds bearing the Pro residue N-geranoyl-Pro, N-palmitoyl-Pro, N-palmiteneoyl-Pro, N-stearoyl-Pro, N-oleoyl-Pro, N-linoleoyl-Pro and N-linolenoyl-Pro.

In another embodiment, flavor modifier compositions according to the present disclosure may also include compounds of formula (IV) and represented by the formula

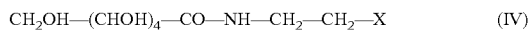

$$CH_2OH-(CHOH)_4-CO-NH-CH_2-CH_2-X \quad (IV)$$

wherein X represents $-OH$, $-O(CO)R$, $-OPO_3H_2$, $-PO_3H_2$, $-OSO_3H$ or $-SO_3H$, and R represents a $C_2-C_{10}$ group comprising at least one carboxylic acid group; and edible salts thereof.

According to one embodiment, the compound of formula (IV) may be incorporated into a meat analog product at a level of from 1 ppb to 100 ppm.

In one embodiment, X represents a hydroxyl group, a phosphate group, a phosphonate group, a sulfate group or a sulfonate group. In another embodiment, X represents a hydroxyl group, a phosphate group or a phosphonate group. In another embodiment, X represents a hydroxyl or a phosphate group.

In formula (IV) the $CH_2OH-(CHOH)_4-CO-$ moiety may represent an aldonic acid residue selected from the group of allonic acid, altronic acid, gluconic acid, mannonic acid, gulonic acid, idonic acid, galactonic acid and talonic acid. In another embodiment, the moiety represents the residue of gluconic acid or mannonic acid.

Another aspect of the present disclosure relates to substances according to aforementioned formula (IV), wherein X represents $-O(CO)R$, $-OPO_3H_2$, $-PO_3H_2$, $-OSO_3H$ or $-SO_3H$, and R represents a $C_2-C_{10}$ group comprising at least one carboxylic acid group, more preferably a $C_2-C_7$, group comprising one carboxylic acid group; and edible salts thereof.

In one embodiment, substances according to formula (IV) wherein X represents a hydroxyl group and the $CH_2OH-(CHOH)_4-CO-$ moiety represents a residue of an aldonic acid selected from allonic acid, altronic acid, mannonic acid, gulonic acid, idonic acid, galactonic acid and talonic acid. In another embodiment X represents a phosphate group, a phosphonate group, a sulfate group or a sulfonate group, the $CH_2OH-(CHOH)_4-CO-$ moiety representing a residue of an aldonic acid selected from gluconic acid and mannonic acid.

In another embodiment the substance according to formula (IV) is a gluconic acid derivative of ethanolamine phosphate, which according to IUPAC rules for nomenclature should be referred to as N-gluconyl ethanolamine phosphate, or an edible salt thereof.

In another embodiment, flavor modifier compositions according to the present disclosure may also include compounds of formula (V) and represented by the formula

$$R^1-CR^7(OR^4)-CO-NR^2-CR^8R^3-X-OR^5 \quad (V)$$

wherein:
X represents a covalent bond; $C_1-C_5$ alkyl or $C_2-C_5$ alkenyl, each optionally substituted with 1-4 substituents selected from hydroxyl, $C_1-C_3$ alkyl and $C_1-C_3$ alkenyl;

$R^1$ represents hydrogen; or $C_1-C_4$ alkyl optionally substituted with 1-5 substituents selected from hydroxyl and oxo; or $C_3-C_5$ alkyl substituted with 3-5 hydroxyl groups $R^2$ represents hydrogen or $C_1-C_4$ alkyl substituted with 1-3 hydroxyl groups;

$R^3$ and $R^8$ independently represent hydrogen; hydroxyl; or $C_1-C_3$ alkyl;

$R^4$ represents hydrogen, $C_1-C_3$ acyl or $C_1-C_3$ alkyl;

$R^5$ represents hydrogen, $C_1-C_3$ acyl, $C_1-C_3$ alkyl, or a phosphate group selected from mono-, di- and triphosphate; and $R^7$ represents hydrogen or $C_1-C_4$ alkyl optionally substituted with 1-5 substituents selected from hydroxyl and oxo;

provided that $R^1-CR^7(OR^4)-CO-$ does not represent a hexose or heptose sugar acid residue comprising more than 4 hydroxyl groups.

According to one embodiment, the compound of formula (V) may be incorporated into a meat analog product at a level of from 1 ppb to 100 ppm.

In one embodiment, substances according to formula (V) wherein X represents a $C_1-C_4$alkyl or $C_2-C_4$alkenyl chain, each optionally substituted with 1-2 substituents selected from hydroxyl and $C_1-C_2$alkyl. In another embodiment. X represents a $C_1-C_3$ alkyl chain, optionally substituted with hydroxyl or methyl. In another embodiment, X represents a $C_1-C_2$ alkyl chain, for example, it represents methylene.

According to another embodiment, $R^1$ represents $C_2-C_8$ alkyl or $C_4-C_6$cycloalkyl, each substituted with 1-6 hydroxyl groups and/or 1-3 carboxyl groups. In another embodiment, $R^1$ represents $C_2-C_6$ alkyl, substituted with 2-6 hydroxyl groups. In another embodiment, $R^1$ represents $C_3-C_5$ alkyl, substituted with 3-5 hydroxyl groups. In another embodiment, $R^1$ represents $C_3-C_5$ alkyl wherein each carbon atom is substituted with a hydroxyl group and $R^7$ represents hydrogen.

Alternatively, $R^1$ and $R^7$ independently represent hydrogen or $C_1-C_4$alkyl optionally substituted with 1-5 substituents selected from hydroxyl and oxo, in another embodiment $R^1$ represents hydrogen, methyl, $-CH_2-COOH$, or $-CHOH-COOH$ and $R^7$ represents hydrogen or $-CH_2-COOH$. In still another embodiment $R^1$ represents $C_1-C_4$ alkyl, for example methyl.

In the aforementioned formula (V) $R^2$ may represent hydrogen or $C_1-C_4$ alkyl. Likewise, $R^3$ $^{may}$ represent hydrogen or $C_1-C_3$ alkyl. Alternatively, $R^2$ may represent $C_1-C_4$ alkyl substituted with 1-3 hydroxyl groups, for example $R^2$ represents 2-hydroxyethyl. In another embodiment $R^2$ represents 2-hydroxyethyl. X represents methyl and $R^3$ and $R^8$ represent hydrogen, such that the substances comprise one or more ax-hydroxy carboxylic acid derivatives of diethanolamine.

According to still another embodiment X represents methylene $-CHOH-CH_2$, or ethylene and $R^3$ and $R^8$ independently represent methyl, hydroxymethyl or hydrogen. In another embodiment $R^3$, $R^8$ and X together comprise 2 carbon atoms such that the substances comprise α-hydroxy carboxylic acid derivatives of amino-propanols and amino-propanediols.

It was found that wherein $R^3$ represents a substituent that is easily deprotonated in aqueous media provide particularly satisfying results. Hence, according to an alternative embodiment $R^5$ represents a $C_2-C_5$carboxyacyl, optionally substituted with optionally further substituted with 1-3 substituents selected from hydroxyl, oxo, $C_1-C_3$ carboxyl, such that monoesters of di and tricarboxylic acids are provided, preferably di- or tricarboxylic acids selected from fumaric acid, tartaric acid, malic acid, citric acid, and aconitic acid.

In a yet another embodiment the substances according to formula (V) are selected from the group consisting of N-lactoyl ethanolamine, N-Lactoyl ethanolamine phosphate, N-α-hydroxy-butanoyl ethanolamine, N-α-hydroxybutanoyl ethanolamine phosphate. N-lactoyl diethanolamine, N-lactoyl-2-amino-1,3-propanediol. N-lactoyl-3-amino-1,2-propanediol, N-lactoyl-3-amino-1-propanol. N-gluconyl-2-amino-1,3-propanediol, N-gluconyl-3-amino-1,2-propanediol, N-mannonyl ethanolamine. N-gluconyl ethanolamine, 2-hydroxyethyl-N tartaramide, 2-hydroxyethyl-N-malamide, and 2-hydroxyethyl-N-citramide.

In another embodiment, flavor modifier compositions according to the present disclosure may also include compounds of formula (VI) and represented by the formula

wherein:
$R^1$ represents hydrogen; $C_1$-$C_8$ alkyl, $C_2$-$C_8$ alkenyl, $C_3$-$C_8$ cycloalkyl or $C_3$-$C_8$ cycloalkenyl or $C_1$-$C_8$ alkyl, $C_2$-$C_8$ alkenyl, $C_3$-$C_8$cycloalkyl or $C_3$-$C_8$cycloalkenyl, each substituted with 1-8 substituents selected from hydroxyl, $C_1$-$C_3$ alkyl, $C_2$-$C_3$ alkenyl and $C_1$-$C_3$ car oxyl;
$R^2$ represents hydrogen; $C_1$-$C_8$ alkyl, $C_2$-$C_8$ alkenyl, $C_3$-$C_8$ cycloalkyl or $C_3$-$C_8$ cycloalkenyl or $C_1$-$C_8$ alkyl, $C_2$-$C_8$ alkenyl, $C_3$-$C_8$ cycloalkyl or $C_3$-$C_8$cycloalkenyl, each substituted with 1-8 substituents selected from hydroxyl, $C_1$-$C_3$ alkyl, $C_1$-$C_3$ alkenyl and $C_1$-$C_3$ carboxyl;
$R^3$ represents hydrogen; or $C_1$-$C_3$ acyl or $C_1$-$C_3$ alkyl, or $C_1$-$C_3$ acyl or $C_1$-$C_3$ alkyl each substituted with 1-3 hydroxyl groups;
and wherein X represents either (i) a six membered heterocyclic ring, comprising at least two nitrogen atoms, or a six-membered heterocyclic ring comprising at least two nitrogen atoms is further substituted with one or more substituents selected from the group consisting of amino; hydroxyl; oxo; alkyl; and a monosaccharide unit, or a 6-membered heterocyclic ring comprising at least two nitrogen atoms being further substituted with one or more substituents selected from the group consisting of amino; hydroxyl; oxo; alkyl and a monosaccharide unit, said monosaccharide unit being esterified with one or more mono-, di-, and/or triphosphate groups or (ii) a bicyclic ring system comprising a five membered heterocyclic ring and a six membered heterocylic ring, each ring comprising at least two nitrogen atoms, or a bicyclic ring system comprising a five membered heterocyclic ring and a six membered heterocylic ring, each ring comprising at least two nitrogen atoms and each ring being further substituted with one or more substituents selected from the group consisting of amino; hydroxyl; oxo; alkyl; and a monosaccharide unit, or a bicyclic ring system comprising a five membered heterocyclic ring and a six membered heterocyclic ring, each ring comprising at least two nitrogen atoms, and each ring further substituted with one or more substituents selected from the group consisting of amino; hydroxyl; oxo; alkyl; and a monosaccharide unit, said monosaccharide unit being esterified with one or more mono-, di- and/or triphosphate groups.

According to one embodiment, the compound of formula (VI) may be incorporated into a meat analog product at a level of from 1 ppb to 100 ppm.

According to one embodiment, X represents an optionally substituted purine or a pyrimidine radical selected from the group of uracil, thymine, cytosine, guanine, adenine, hypoxanthine, xanthine, theophylline and theobromine, even more preferably, from the group of guanine, cytosine and adenine.

In another embodiment. X represents guanosine monophosphate (GMP), adenosine monophosphate (AMP), cytidine monophosphate (CMP) or inosine monophosphate (IMP). Here the term "monophosphate" also encompasses cyclic monophosphate.

According to another embodiment. $R^1$ represents $C_2$-$C_8$ alkyl or $C_4$-$C_6$cycloalkyl, said alkyl or cycloalkyl being substituted with 1-6 hydroxyl groups and/or 1-3 carboxyl groups, in another embodiment $R^1$ represents $C_2$-$C_6$alkyl, substituted with 2-6 hydroxyl groups; in another embodiment $R^1$ represents $C_3$-$C_5$ alkyl, substituted with 3-5 hydroxyl groups; and in yet another embodiment $R^1$ represents hydrogen or $C_1$-$C_4$ alkyl, for example methyl.

In the aforementioned formula (VI) $R^2$ represents hydrogen or $C_1$-$C_4$ alkyl, most preferably hydrogen. Likewise, $R^3$ preferably represents hydrogen; or $C_1$-$C_3$ acyl, optionally substituted with 1-3 hydroxyl groups, more preferably it represents hydrogen or $C_1$-$C_3$ acyl or $C_2$-$C_3$ acyl substituted with 2-3 hydroxyl groups, most preferably R represents hydrogen.

According to another embodiment X represents a heterocyclic ring or ring system which is substituted with at least a pentose monosaccharide unit and the CO—X bond in formula (I) represents an ester bond. More particularly, it represents an ester bond connecting the $R^1$—$CR^2(OR^3)$—CO— moiety to an oxygen atom of a pentose monosaccharide unit substituted on the heterocyclic ring or ring system.

In another preferred embodiment, the CO—X bond represents an amide bond, particularly an amide bond connecting the acyl group with an amino group substituted on the heterocyclic ring or ring system or with a nitrogen atom in the heterocyclic ring or ring system as described above. Most preferably, the amide bond connects the acyl group with a nitrogen atom substituted on the heterocyclic ring or ring system.

Hence, some non-limiting examples include N-lactoyl GMP, N-lactoyl AMP, N-lactoyl CMP, N-lactoyl IMP. N-gluconyl GMP, N-gluconyl AMP, N-gluconyl CMP and N-gluconyl IMP. According to another embodiment, non-limiting examples include O-lactoyl-GMP, O-lactoyl AMP, O-lactoyl CMP, O-lactoyl IMP. O-gluconyl GMP, O-gluconyl AMP. O-gluconyl CMP and O-gluconyl IMP.

Meat Analog Composition and Extrusion Process

The present disclosure further relates to meat analog products and methods for making meat analog products comprising the flavor modifier compositions described herein. The meat analog products are produced with high moisture content and provide a product that simulates the fibrous structure of animal meat and has a desirable meat-like moisture, texture, mouthfeel, flavor and color.

Texturization of protein is the development of a texture or a structure via a process involving heat, and/or shear and the addition of water. The texture or structure will be formed by protein fibers that will provide a meat-like appearance and perception when consumed. The mechanism of texturization of proteins starts with the hydration and unfolding of a given protein by breaking intramolecular binding forces by heat and/or shear. The unfolded proteins molecules are aligned and bound by shear, forming the characteristic fibers of a meat-like product. In one embodiment, polar side chains from amino acids form bonds with linear protein molecules and the bonds will align protein molecules, forming the characteristic fibers of a meat-like product.

To make non-animal proteins palatable, texturization into fibrous meat analogs, for example, through extrusion processing has been an accepted approach. Due to its versatility, high productivity, energy efficiency and low cost, extrusion processing is widely used in the modern food industry. Extrusion processing is a multi-step and multifunctional operation, which leads to mixing, hydration, shear, homogenization, compression, deaeration, pasteurization or sterilization, stream alignment, shaping, expansion and/or fiber formation. Ultimately, the non-animal protein, typically introduced to the extruder in the form of a dry blend, is processed to form a fibrous material.

More recent developments in extrusion technology have focused on using twin screw extruders under high moisture (40-80%) conditions for texturizing non-animal proteins into fibrous meat alternatives. In the high moisture twin screw process, also known as "wet extrusion", the raw materials, predominantly non-animal proteins such as soy and/or pea protein, are mixed and fed into a twin-screw extruder, where a proper amount of water is dosed in and all ingredients are further blended and then melted by the thermo-mechanical action of the screws. The realignment of large protein molecules, the laminar flow, and the strong tendency of stratification within the extruder's long slit cooling die contribute to the formation of a fibrous structure. The resulting wet-extruded products tend to exhibit improved whole muscle meat-like visual appearance and improved palatability. Therefore, this extrusion technology shows promise for texturizing non-animal proteins to meet increasing consumer demands for healthy and tasty foods.

Texturization processes may also include spinning, simple shear flow, and simple shear flow and heat in a Couette Cell ("Couette Cell" technology). The spinning process consists of unfolding protein molecules in a high alkaline pH solution, and coagulating the unfolded protein molecules by spraying the protein alkaline solution into an acid bath. The spraying is made by a plate with numerous fine orifices. The protein coagulates forming fibers as soon as it gets in contact with the acid medium. The fibers are then washed to remove remaining acid and/or salts formed in the process. A Couette Cell is a cylinder based device where the inner cylinder rotates and the outer cylinder is stationary, being easy to scale up. The Couette Cell operates under the same principle of forming protein fibers by subjecting the protein to heat and shear in the space between the stationary cylinder and the rotational cylinder.

With respect to simple shear flow and heat in a Couette Cell, this process can induce fibrous structural patterns to a granular mixture of non-animal proteins at mild process conditions. This process is described in "On the use of the Couette Cell technology for large scale production of textured soy-based meat replacers", Journal of Food Engineering 169 (2016) 205-213, which is incorporated herein by reference.

Meat analog products having qualities (for example, texture, moisture, mouthfeel, flavor, and color) similar to that of whole muscle animal meat may be produced using non-animal proteins formed using extrusion under conditions of relatively high moisture. In one embodiment, meat analog products may include non-animal protein, one or more of flour, starch, and edible fiber, an edible lipid material and a flavor modifier composition as described above.

In one embodiment, the amount of non-animal protein included in the mixture to be extruded includes no more than about 90% by weight of the dry ingredients. For example, the amount of non-animal protein present in the ingredients utilized to make meat analog products according to the present disclosure may range from about 3% f to about 90% by weight of the dry ingredients. In another embodiment, the amount of non-animal protein present in the ingredients utilized to make meat analog products according to the present disclosure may range from about 10% to about 80% by weight of the dry ingredients. In a further embodiment, the amount of non-animal protein present in the dry ingredients utilized to make meat analog products according to the present disclosure may range from about 25% to about 50% by weight, in another further embodiment, the amount of non-animal protein present in the dry ingredients utilized to make meat analog products according to the present disclosure may be about 40%.

The term "dry ingredients" includes all the ingredients in the mixture to be extruded except for added water and ingredients added with the added water (i.e., the "wet ingredients") such as a protein binder and one or more off-note blocking compounds described below. Thus, the dry ingredients include the non-animal protein component, the carbohydrate component, the edible lipid component (despite the fact that the edible lipid component may be a liquid oil) and a flavor modifier composition.

In one embodiment, the non-animal protein ingredients are isolated from soybeans. Suitable soybean derived protein-containing ingredients include soy protein isolate, soy protein concentrate, soy flour, and mixtures thereof. The soy protein materials may be derived from whole soybeans in accordance with methods generally known in the art. In another exemplary embodiment, the non-animal protein ingredients are isolated from grain, legume or pulses, seed and oilseed, nut, algal, mycoprotein or fungal protein, insects, leaf protein and combinations thereof as described herein.

In addition to a non-animal protein component, the meat analog products described herein comprise a carbohydrate component. A variety of ingredients may be used as all or part of the carbohydrate component. That said, such ingredients are typically classified as a starch, a flour, or an edible fiber and the carbohydrate component may comprise one or more types of starch, flour, edible fiber, and combinations thereof. Examples of starch include wheat starch, corn starch, rice starch, oat starch, potato starch, and combinations thereof. Examples of flour include wheat flour, rice flour, white corn flour, oat flour, sorghum flour, rye flour, amaranth flour, *quinoa* flour, and combinations thereof.

Edible fiber is a particularly advantageous carbohydrate to include in the extrusion mixture because fiber tends to bind water when the mixture is extruded. Any appropriate type of edible fiber may be used in the present invention in appropriate amounts. Exemplary sources of edible fiber include soluble and insoluble dietary fiber, wood pulp cellulose, modified cellulose, seed husks, oat hulls, citrus fiber, carrot fiber, pea fiber, corn bran, soy polysaccharide, oat bran, wheat bran, barley bran, and rice bran. The fiber may be present in the dry pre-mix from about 0.1% to about 10% by weight. In one embodiment, the fiber is about 2% to about 8% by weight of the dry ingredients. In another embodiment the fiber is about 5% by weight of the dry ingredients. Particularly desirable types of fiber are those that effectively bind water when the mixture of non-animal protein and fiber is extruded.

In one embodiment, the meat analog product comprises non-animal protein, starch, gluten, and edible fiber (for example, carrot fiber). In another embodiment the meat analog product comprises non-animal protein derived from soybeans and one or more ingredients selected from the group consisting of a starch, flour, gluten, an edible fiber, and mixtures thereof. In another embodiment the meat analog product comprises protein derived from peas and one or more ingredients selected from the group consisting of a starch, flour, gluten, an edible fiber, and mixtures thereof.

In addition to the foregoing, the ingredients utilized to make the meat analog product may include an edible lipid component that comprises one or more edible lipids.

In accordance with the present disclosure, nearly any edible lipid material may be employed, including natural and synthetic oils, for example, rapeseed, canola, soybean, cottonseed, peanut, palm and corn oils and in either non-hydrogenated or partially hydrogenated form. In one embodiment, the edible lipid material is an edible vegetable oil, such as canola oil, cottonseed oil, peanut oil, and olive oil.

In one embodiment, the total edible lipid content is no more than about 5% of the weight of the dry ingredients utilized the make the meat analog product. As such, in one embodiment, the total edible lipid content is an amount of about 0.1% to about 1% by weight of the dry ingredients. In another embodiment, the total edible lipid content is an amount of about 0.2% to about 0.5% by weight of the dry ingredients.

In addition to the foregoing, the meat analog product includes water at a relatively high amount. In one embodiment, the total moisture level of the mixture extruded to make the meat analog product is controlled such that the meat analog product has a moisture content that is at least about 50% by weight. To achieve such a high moisture content, water is typically added to the ingredients. Although, a relatively high moisture content is desirable, it may not be desirable for the meat analog product to have a moisture content much greater than about 65%. As such, in one embodiment the amount of water added to the ingredients and the extrusion process parameters are controlled such that the meat analog product (following extrusion) has a moisture content that is from about 40% to about 65% by weight.

In one embodiment, along with the water are added additional "wet ingredients" including, for example, a protein binder and one or more off-note blocking compounds. In accordance with one embodiment, the protein binder according to the present disclosure may include a mixture of at least one terpene and at least one carbonyl compound. In another embodiment, the protein binder may include a mixture of a terpene and two or more carbonyl compounds.

In one embodiment, suitable terpenes (isoprenoids and tetraterpenoids) include, but are not limited to, carotenes (such as, for example, alpha-carotene, beta-carotene, gamma-carotene, delta-carotene, lycopene, neurosporene, phytofluene, phytoene), and xanthophylls (such as, for example, canthaxanthin, cryptoxanthin, aeaxanthin, astaxanthin, lutein, rubixanthin); monoterpenes (such as, for example, limonene, perillyl alcohol); sesquiterpenes (such as, for example, caryophyllene, β-caryophyllene, zingiberene); saponins; lipids including: phytosterols, campesterol, beta sitosterol, gamma sitosterol, stigmasterol), tocopherols (vitamin E), omega-3, -6, and -9 fatty acids (such as, for example, gamma-linolenic acid; triterpenoids (such as, for example, oleanolic acid, ursolic acid, betulinic acid, moronic acid); alpha-pinenes, cis-beta-ocimenes and bisabolenes (such as alpha-bisabolene and gamma-bisabolene; and terpene alcohols (such as for example, (2E,6Z)-farnesol, and alpha-terpineol).

Suitable carbonyl compounds include ketones and aldehydes, including, but are not limited to, acetone, acetyl methyl carbinol, acetophenone, 2-butanone, L-carvone, D-carvone, diacetyl, 2-heptanone, beta-ionone, L-menthone, anisyl acetaone, methyl cyclopentenolone, methyl nonyl ketone, methyl heptenone, 2-nonanone, 2-octanone, 2-pentanone, 2-undecanonen, 4-hydroxy-2,5dimethyl-3(2H)-furanone, nootkatone, tridecanone, tetradecalactone, decalactone, butyrolactone, 2-tridecanone, benzaldehyde, n-butyraldehyde, isobutraldehyde, cinnamic aldehyde, citronellal, decanal, docecenal, hexanal, aldehyde C-12, aldehyde C-8, acetaldehyde, trans-2-hexenal, anisyl aldehyde, trans 2-decenal, cis-3-hexenal and cis-4-heptenal.

A meat analog product may include the protein binder in an amount from about 0.1% to about 1%, in another embodiment from about 0.15% to about 0.8%, in yet another embodiment from about 0.2% to about 0.5%, or any individual number within the range, by weight of the product.

An off-note blocking compound is selected based on its ability to block, mask or modify the undesirable off-note(s) in a particular non-animal derived protein. Masking or blocking undesirable flavor notes has been practiced in food and beverage development for many years. Historically, this involved using more sugar or fat to cover bitterness and adjust flavor perception. Flavorists simply "over flavored" their products to hide the offending taste. These traditional methods are wholly unsatisfactory, especially for health conscious consumers where reduced fat and sugar content is a common goal.

Various non-animal proteins provide undesirable off-notes. Particularly, undesirable off-notes are the beany, bitter, grassy, astringent, earthy, chalky, and rancid off-notes. The term off-note refers to an unpleasant after taste that develops over time after consumption of consumables. The addition of off-note blockers will block, mask or modify the off-notes and make them less apparent or unnoticeable. Non-animal proteins will thereby lose their beany/bitter/grassy/astringent/earthy/chalky/rancid taste.

The off-note blockers can be added to meat analog products to block the undesirable off-notes of non-animal proteins present in said products. For example, in soy products, the off-note blocker may be added to suppress the bitterness and beany off-notes associated with peptides and isoflavones, such as genistein and daidzein present in said products. In HVP (hydrolysed vegetable protein) products, the off-note blocker may be added to suppress the bitterness associated with bitter peptides present in said products.

According to one embodiment, suitable off-note blocking compounds for use in accordance with the present disclosure include fatty acids including, but not limited to, nonanoic acid, decanoic acid, dodecanoic acid, tetradecanoic acid, hexadecanoic acid, oleic acid, octanoic acid, 9-decenoic and hexanoic.

In another embodiment, suitable off-note blocking compounds include carbonyls including, but not limited to, acetoin, acetyl propionyl, 2-heptanone, 2-nonanone, 2-undecanone and cis-4-heptenal. In another embodiment, suitable off-note blocking compounds include sulfur, including, but not limited to, dimethyl sulfide, dimethyl trisulfide and extracts of alliaceous ingredients.

In another embodiment, suitable off-note blocking compounds include sweet browns including, but not limited to, maltol, vanillin, cyclopentenolone, furaneol, vanilla extracts, vanilla derivatives, caramel extracts and condensed milk derivatives.

In another embodiment, suitable off-note blocking compounds include esters including, but not limited to, ethyl caprate, ethyl dodecanoate, ethyl myristate, ethyl palmitate and ethyl oleate. In another embodiment, suitable off-note blocking compounds include sweeteners including but not limited to, steviol glycosides such as rebaudiosides; rebusodide, swingle extract, mogroside V, erythritol, glucosylated steviol glycosides, honey distillates and sugar distillates.

In another embodiment, suitable off-note blocking compounds include lactones including, but not limited to, gamma decalactone, delta decalactone, delta dodecalactone, gamma undecalactone and massoia lactone. In another embodiment, off-note blocking compounds include juice derivatives including, but not limited to, strawberry, cucumber, apple, cherry, kiwi and apricot.

The meat analog product may include the off-note blocking compound in an amount from about 0.1% to about 1%, in another embodiment from about 0.15% to about 0.8%, in another embodiment from about 0.2% to about 0.5%, or any individual number within the range, by weight of product.

In accordance with another embodiment, the meat analog product may include a plurality of off-note blocking compounds, including, for example, 5, 6, 7, 8, 9, 10, 11, 12, 13, 14, 15, 16, 17, 18, 19, 20, 21, 22, 23, 24, 25, 26, 27, 28, 29, 30 or more off-note blocking compounds.

The present disclosure further relates to methods for making meat analog products comprising flavor modifier compositions. A suitable extrusion process for the preparation of the meat analog product comprises introducing non-animal protein component, the carbohydrate component, the flavor modifier composition and other ingredients such as an edible lipid into a mixing tank (i.e., an ingredient blender such as a ribbon blender or equivalent mixer)) to combine the ingredients and form a dry blended pre-mix. The dry blended pre-mix is then transferred to a hopper from which the dry blended ingredients are fed to an extruder in which the dry ingredients and injected water are mixed and heated under mechanical pressure generated by the screws of the extruder to form a molten extrusion mass. The molten extrusion mass exits the extruder through an extrusion die.

In another embodiment according to the present disclosure, the flavor modifier composition and any additional ingredients, for example, flavorants, may be added to the meat analog products post-extrusion. In one example, a meat analog product such as soy burger patties may be formed as described above except that the flavor modifier composition and any flavorants are not added prior to extrusion. Rather, the extrusion mass of non-animal protein may be chopped into pieces and blended with the flavor modifier composition and any flavorants. In one embodiment, the blended mixture may then be shaped into burger patties, cooked, cooled down, frozen and packaged.

Extrusion Equipment and Process Conditions

Among the suitable extrusion apparatuses useful in the practice of the described process is a commercially available double barrel, twin-screw extruder apparatus such as a Wenger TX 52 model manufactured by Wenger (Sabetha, Kans.).

The screws of a twin-screw extruder can rotate within the barrel in the same or opposite directions. Rotation of the screws in the same direction is referred to as single flow or co-rotating whereas rotation of the screws in opposite directions is referred to as double flow or counter-rotating. The speed of the screw or screws of the extruder may vary depending on the particular apparatus; however, it is typically from about 100 to about 450 revolutions per minute (rpm). Generally, as the screw speed increases, the density of the extrudate will decrease. The extrusion apparatus contains screws assembled from shafts and worm segments, as well as mixing lobe and ring-type shearing elements as recommended by the extrusion apparatus manufacturer for extruding non-animal protein material.

The extrusion apparatus generally comprises a plurality of heating zones through which the protein mixture is conveyed under mechanical pressure prior to exiting the extrusion apparatus through an extrusion die. The temperature in each successive heating zone generally exceeds the temperature of the previous heating zone by between about 10° C. to about 70° C. In one embodiment, the dry premix is transferred through multiple heating zones within the extrusion apparatus, with the protein mixture heated to a temperature of from about 25° C. to about 170° C. such that the molten extrusion mass enters the extrusion die at a temperature of from about 170° C. In one embodiment, the protein mixture is heated in the respective heating zones to temperatures of about 25° C., about 40° C., about 95° C., about 150° C. and about 170° C.

The pressure within the extruder barrel is typically between about 30 psig and about 500 psig, or more specifically between about 50 psig and about 300 psig. Generally, the pressure within the last two heating zones is between about 50 psig and about 500 psig, even more specifically between about 50 psig to about 300 psig. The barrel pressure is dependent on numerous factors including, for example, the extruder screw speed, feed rate of the mixture to the barrel, feed rate of water to the barrel, and the viscosity of the molten mass within the barrel.

Water along with additional "wet ingredients" are injected into the extruder barrel to hydrate the non-animal protein mixture and promote texturization of the proteins. As an aid in forming the molten extrusion mass, the water may act as a plasticizing agent. Water may be introduced to the extruder barrel via one or more injection jets. The rate of introduction of water to the barrel is generally controlled to promote production of an extrudate having the aforementioned desired characteristics, such as an extrudate with a moisture content as described above.

Examples

The following examples are given solely for the purpose of illustration and are not to be construed as limitations of the present invention, as many variations of the invention are possible without departing from the spirit and scope of the present disclosure.

Soy protein isolate (Profam® 974, Archer Daniels Midland Company, Decatur, Ill.), rice flour (Ingredients, Inc., Buffalo Grove, Ill.), carrot fiber (Ingredients. Inc., Buffalo Grove. Ill.), and canola oil were used as ingredients and were blended for 15 to 20 minutes to form the base, i.e. control, dry feed formulation.

Extrusion was performed using a pilot-scale, co-rotating, intermeshing, twin-screw food extruder (Wenger TX 52 model manufactured by Wenger (Sabetha, Kans.)). A continuous dry feeding equipment was used to feed the raw materials into the extruder. While operating, water was injected, via an inlet port, into the extruder by a positive displacement pump. The pump was pre-calibrated and adjusted so that the extrudate moisture content was 61%. The screw speed was set at 250 rpm. At the end of the extruder, a long cooling die was attached, with a dimension of 3 in ×½ in ×48 in (W×H×L).

As seen in Table 1 below, four different meat analog products were prepared via extrusion (Examples 1-4). Example 1 was the Control; Example 2 was the Control plus an off-note blocking compound; Example 3 was the Control plus an off-note blocking compound and a flavor modifier composition according to the present disclosure; and Example 4 was the Control plus a protein binder. Using a bench-top tasting panel (consisting of 8 panelists), panelists were asked to record the sensory attribute differences between the Control and example samples, particularly focusing on off-notes (reduction or differences) and savory notes.

TABLE 1

Meat Analog Compositions

| | Example 1 (Control) | Example 2 | Example 3 | Example 4 |
|---|---|---|---|---|
| Dry Ingredients (39 wt %) | | | | |
| Soy Protein Isolate | 30.81 | 30.63 | 29.85 | 30.65 |
| Rice Flour | 5.85 | 5.82 | 5.67 | 5.82 |
| Carrot Fiber | 1.95 | 1.94 | 1.89 | 1.94 |
| Canola Oil | 0.39 | 0.39 | 0.38 | 0.39 |
| Flavor Modifier | | | 0.99 | |
| Protein Binder | | | | 0.20 |
| Off-note blocking compound | | 0.23 | 0.23 | |
| Wet Ingredients (61 wt %) | | | | |
| Water (Moisture Content) | 61.00 | 61.00 | 61.00 | 61.00 |
| Total | 100 | 100 | 100 | 100 |

Panelists preferred Example 3 and detected less off-notes and improved savory notes in Example 3 (including flavor modifier) over either Example 1 (control, no addition), Example 2 (off-note blocking compound alone) and Example 4 (protein binder alone).

As seen in Table 2 below, four different meat analog products were prepared via extrusion (Examples 5-8). Example 5 was the Control; Example 6 was the Control plus an off-note blocking compound and a flavor modifier composition according to the present disclosure; Example 7 was the Control plus an off-note blocking compound and a protein binder; and Example 8 was the Control plus an off-note blocking compound, a protein binder and a flavor modifier composition according to the present disclosure. Using a bench-top tasting panel (consisting of 8 panelists), panelists were asked to record the sensory attribute differences between the Control and example samples, particularly focusing on off-notes (reduction or differences).

TABLE 2

Meat Analog Compositions

| | Example 5 (Control) | Example 6 | Example 7 | Example 8 |
|---|---|---|---|---|
| Dry Ingredients (39 wt %) | | | | |
| Soy Protein Isolate | 30.81 | 29.85 | 30.47 | 29.67 |
| Rice Flour | 5.85 | 5.67 | 5.79 | 5.64 |
| Carrot Fiber | 1.95 | 1.89 | 1.93 | 1.88 |
| Canola Oil | 0.39 | 0.38 | 0.39 | 0.38 |
| Flavor Modifier | | 0.99 | | 0.99 |
| Protein Binder | | | 0.20 | 0.20 |
| Off-note blocking compound | | 0.23 | 0.23 | 0.23 |
| Wet Ingredients (61 wt %) | | | | |
| Water (Moisture Content) | 61.00 | 61.00 | 61.00 | 61.00 |
| Total | 100 | 100 | 100 | 100 |

Panelists preferred Example 8 and detected less off-notes and improved savory notes in Example 8 (off-note blocking compound, binder and flavor modifier) over either Example 5 (control, no addition), Example 6 (off-note blocking compound and flavor modifier) and Example 7 (off-note blocking compound and protein binder).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition that modifies the flavor of for a meat analog comprising:
   a yeast extract present in an amount in the range of from about 5% to about 30%, calculated on a dry matter basis;
   a fatty acid selected from the group consisting of lauric acid, lauroleic acid, myristic acid, myristoleic acid, pentadecanoic acid, palmitic acid, stearic acid, oleic acid, palmitoleic acid, margaric acid, dihydroxystearic acid, ricinoleic acid, elaidic acid, alpha-linolenic acid, dihomogamma-linolenic acid, eleostearic acid, licanic acid, arachidonic acid, arachidic acid, eicosenoic acid, behenic acid, erucic acid, lignoceric acid and mixtures thereof, wherein the fatty acid is present in an amount in the range of from 1% to about 10%, calculated on a dry matter basis;
   peptide material having a molecular weight of from about 300 to about 10,000 daltons; and
   at least two free amino acids wherein at least one free amino acid is a sulfur containing amino acid,
   wherein the composition is free of animal-derived ingredients.

2. The composition according to claim 1, wherein the peptide material is derived from at least one non-animal protein.

3. The composition according to claim 1, wherein the peptide material is present in an amount in the range of from about 0.5% to about 5%, calculated on a dry matter basis.

4. The composition according to claim 1, wherein the at least two amino acids are selected from the group consisting of cysteine, methionine, lysine, arginine, histidine, taurine, aspartic, alanine, leucine, isoleucine, glutamine, phenylalanine, proline, valine, glycine, serine and threonine.

5. The composition according to claim 1, wherein the composition further comprises at least one member selected from the group consisting of a flavorant, a stabilizer, an emulsifier, a preservative, gum, starch, a dextrin, a vitamin and mineral, a functional ingredient, an organic acid, an umami compound, a ribotide, vegetable oil, a salt, an antioxidant and a sweetener.

6. A meat analog comprising the composition according to claim 1.

7. A meat analog free of animal-derived ingredients comprising:
   a non-animal protein;
   a carbohydrate;
   an edible lipid; and
   a composition that modifies the flavor of the meat analog, including a yeast extract present in an amount in the range of from about 5% to about 30%, calculated on a dry matter basis; peptide material having a molecular weight of from about 300 to about 10,000 daltons; and at least two free amino acids wherein at least one free amino acid is a sulfur containing amino acid.

8. The meat analog according to claim 7, wherein the non-animal protein is selected from the group consisting of grain; legume; pulses; seed; oilseed; nut; algal; mycoprotein; fungal protein; insects and leaf protein.

9. The meat analog according to claim 7, wherein the non-animal protein is selected from the group consisting of rice; millet; maize; barley; wheat; oat; sorghum; rye; teff; triticale; amaranth; buckwheat; *quinoa*; soybean; sesame; mung beans; chickpeas; garbanzo; peas; fava beans; lentils; lima beans; lupins; peanuts; pigeon peas; runner beans; kidney beans; navy beans; pinto beans; azuki beans; cowpea; black-eyed peas; black mustard; India mustard; rapeseed; canola; safflower; sunflower seed; flax seed; hemp seed; poppy seed; pumpkin; chia; sesame; almond; walnut; Brazil; Macadamia; cashews; chestnuts; hazelnuts; pine; pecans; pistachio; gingko; kelp; wakame; *Spirulina*; and *Chlorella*.

10. The meat analog according to claim 7, further comprising a protein binder including a mixture of at least one terpene and at least one carbonyl compound and one or more off-note blocking compounds.

11. The meat analog according to claim 10, wherein the at least one terpene comprises at least one of carotenes; monoterpenes; sesquiterpenes; saponins; lipids; triterpenoids; alpha-pinenes; cis-beta-ocimenes; bisabolenes and terpene alcohols.

12. The meat analog according to claim 10, wherein the at least one carbonyl compound is selected from the group consisting of aldehydes and ketones.

13. The meat analog according to claim 7, wherein the peptide material is derived from at least one non-animal protein.

14. The meat analog according to claim 7, including from about 25% to about 35% by weight of non-animal derived protein.

15. The meat analog according to claim 7, wherein the at least two amino acids are selected from the group consisting of cysteine, methionine, lysine, arginine, histidine, taurine, aspartic, alanine, leucine, isoleucine, glutamine, phenylalanine, proline, valine, glycine, serine and threonine.

16. A method of producing a meat analog free of animal-derived ingredients, the method comprising:
   producing a composition that modifies the flavor of the meat analog, wherein the composition comprises a yeast extract present in an amount in the range of from about 5% to about 30%, calculated on a dry matter basis; a fatty acid selected from the group consisting of lauric acid, lauroleic acid, myristic acid, myristoleic acid, pentadecanoic acid, palmitic acid, stearic acid, oleic acid, palmitoleic acid, margaric acid, dihydroxystearic acid, ricinoleic acid, elaidic acid, alpha-linolenic acid, dihomogamma-linolenic acid, eleostearic acid, licanic acid, arachidonic acid, arachidic acid, eicosenoic acid, behenic acid, erucic acid, lignoceric acid and mixtures thereof, wherein the fatty acid is present in an amount in the range of from 1% to about 10%, calculated on a dry matter basis; peptide material having a molecular weight of from about 300 to about 10,000 daltons; and at least two free amino acids wherein at least one free amino acid is a sulfur containing amino acid;
   mixing the composition with a non-animal protein; and
   texturizing the mixture into a meat analog form having a moisture content of from about 50% to about 65%.

17. The method according to claim 16, wherein the step of texturizing is selected from the group consisting of extrusion, spinning, simple shear flow and Couette Cell technology.

* * * * *

UNITED STATES PATENT AND TRADEMARK OFFICE
CERTIFICATE OF CORRECTION

| | |
|---|---|
| PATENT NO. | : 11,517,036 B2 |
| APPLICATION NO. | : 16/498670 |
| DATED | : December 6, 2022 |
| INVENTOR(S) | : Yuangang Zhang et al. |

It is certified that error appears in the above-identified patent and that said Letters Patent is hereby corrected as shown below:

On the Title Page

Please delete the Title page and insert the attached Title page showing the corrected number of claims In the Claims Claim 1 (Column 20, Lines 24-25) should recite "A flavor modifier composition for a meat analog comprising:"

The Claim 1 recitation "wherein the composition is free of animal-derived ingredients" (at Column 20, Lines 45-46) should be deleted Claim 2 (Column 20, Line 47) should recite "The flavor modifier composition according to claim 1, wherein the"

Claim 3 (Column 20, Line 50) should recite "The flavor modifier composition according to claim 1, wherein the"

Claim 4 (Column 20, Line 53) should recite "The flavor modifier composition according to claim 1, wherein the"

Claim 5 (Column 20, Line 59) should recite "The flavor modifier composition according to claim 1, wherein the"

Claim 6 (Column 20, Lines 66-67) should recite "A meat analog comprising the flavor modifier composition according to claim 1."

Please add new Claim 18 (Column 22, Line 40) "The flavor modifier composition according to claim 1, wherein the composition is free of animal-derived ingredients."

Signed and Sealed this
Twelfth Day of November, 2024

Katherine Kelly Vidal
*Director of the United States Patent and Trademark Office*

(12) United States Patent
Zhang et al.

(10) Patent No.: US 11,517,036 B2
(45) Date of Patent: Dec. 6, 2022

(54) FLAVOR MODIFIERS FOR MEAT ANALOG PRODUCTS

(71) Applicant: Givaudan SA, Vernier (CH)

(72) Inventors: Yuangang Zhang, Cincinnati, OH (US); Panchali Chakraborty, Mason, OH (US); Francisco Valentino Villagran, Mason, OH (US)

(73) Assignee: Givaudan SA, Vernier (CH)

( * ) Notice: Subject to any disclaimer, the term of this patent is extended or adjusted under 35 U.S.C. 154(b) by 291 days.

(21) Appl. No.: 16/498,670

(22) PCT Filed: Apr. 6, 2018

(86) PCT No.: PCT/EP2018/058918
§ 371 (c)(1),
(2) Date: Sep. 27, 2019

(87) PCT Pub. No.: WO2018/185318
PCT Pub. Date: Oct. 11, 2018

(65) Prior Publication Data
US 2020/0037646 A1 Feb. 6, 2020

Related U.S. Application Data

(60) Provisional application No. 62/483,063, filed on Apr. 7, 2017.

(51) Int. Cl.
*A23L 27/21* (2016.01)
*A23L 27/26* (2016.01)
*A23L 31/15* (2016.01)
*A23J 3/22* (2006.01)

(52) U.S. Cl.
CPC ............ *A23L 27/21* (2016.08); *A23J 3/227* (2013.01); *A23L 27/26* (2016.08); *A23L 31/15* (2016.08); *A23V 2002/00* (2013.01)

(58) Field of Classification Search
CPC .......... A23L 27/21; A23L 23/26; A23L 31/15; A23J 3/227; A23V 2002/00

USPC .................................................. 426/534
See application file for complete search history.

(56) References Cited

U.S. PATENT DOCUMENTS

| 3,320,070 A | 5/1967 | Hartmann |
| 3,365,306 A | 1/1968 | Perret |
| 5,039,543 A * | 8/1991 | Lee ............... A23L 27/215 426/533 |
| 2009/0291188 A1* | 11/2009 | Milne ............. A23L 13/428 426/574 |
| 2012/0207904 A1* | 8/2012 | Twombly .......... A23J 3/16 426/540 |
| 2014/0205729 A1 | 7/2014 | Didzbalis et al. |
| 2015/0086694 A1 | 3/2015 | Shi et al. |
| 2016/0235090 A1 | 8/2016 | Janvary et al. |
| 2017/0055548 A1* | 3/2017 | Chakraborty ..... A23C 9/1307 |
| 2017/0188612 A1* | 7/2017 | Varadan .......... A23L 13/43 |

FOREIGN PATENT DOCUMENTS

| CN | 101971960 A | 2/2011 |
| EP | 2 695 526 A1 | 2/2014 |
| GB | 1311302 A | 3/1973 |
| KR | 10 2013 0065927 A | 6/2013 |

OTHER PUBLICATIONS

International Search Report for PCT Application No. PCT/EP2018/058918, dated May 28, 2018.
Written Opinion for PCT Application No. PCT/EP2018/058918, dated May 28, 2018.
GB Search Report for Application No. GB 1707641.5, dated Oct. 19, 2017.

* cited by examiner

*Primary Examiner* — Hamid R Badr
(74) *Attorney, Agent, or Firm* — Curatolo Sidoti & Trillis Co., LPA; Floyd Trillis, III; Salvatore A. Sidoti

(57) ABSTRACT

A flavor modifier composition for a meat analog is provided. The flavor modifier composition includes a yeast extract; a fatty acid; peptide material having a molecular weight of from about 300 to about 10,000 daltons; and at least two free amino acids wherein at least one free amino acid is a sulfur containing amino acid.

18 Claims, No Drawings